(12) United States Patent
Torres-Muniz et al.

(10) Patent No.: US 9,272,842 B1
(45) Date of Patent: Mar. 1, 2016

(54) MODULAR GARBAGE COLLECTION APPARATUS

(71) Applicants: Raul Edmir Torres-Muniz, Anasco, PR (US); Rafael A. Gonzalez, Hormiguero, PR (US); Damian Ortega, Arroyo, PR (US); Carlos J Gomez, Guaynabo, PR (US)

(72) Inventors: Raul Edmir Torres-Muniz, Anasco, PR (US); Rafael A. Gonzalez, Hormiguero, PR (US); Damian Ortega, Arroyo, PR (US); Carlos J Gomez, Guaynabo, PR (US)

(73) Assignee: University of Puerto Rico, San Juan, PR (US)

( * ) Notice: Subject to any disclaimer, the term of this patent is extended or adjusted under 35 U.S.C. 154(b) by 53 days.

(21) Appl. No.: 14/163,867

(22) Filed: Jan. 24, 2014

Related U.S. Application Data (60) Provisional application No. 61/755,479, filed on Jan. 23, 2013.

(51) Int. Cl.
  *B30B 9/32* (2006.01)
  *B65F 1/14* (2006.01)
  *B30B 9/30* (2006.01)
  *B65F 1/00* (2006.01)

(52) U.S. Cl.
  CPC ............. *B65F 1/1426* (2013.01); *B30B 9/3014* (2013.01); *B30B 9/321* (2013.01); *B65F 1/1405* (2013.01); *B65F 2001/008* (2013.01); *B65F 2210/176* (2013.01); *B65F 2240/1126* (2013.01); *B65F 2240/12* (2013.01); *Y10S 100/902* (2013.01)

(58) Field of Classification Search
  CPC .......... B30B 9/32; B30B 9/321; B30B 9/326; B30B 9/3096; B30B 9/3007; B30B 9/3057; B30B 9/306; B30B 15/08; B30B 9/3014; B65F 1/0033; B65F 1/1405; B65F 1/1426; B65F 2001/008; B65F 2210/176; B65F 2240/1126; B65F 2240/12; Y10S 100/902; B07C 5/126
  USPC ......... 100/43, 45, 48, 341, 342, 94, 98 R, 99, 100/215, 218, 229 R, 229 A, 240, 245, 902; 209/213, 522, 523, 524, 527; 241/99
  See application file for complete search history.

(56) References Cited

U.S. PATENT DOCUMENTS

| | | | | |
|---|---|---|---|---|
| 4,653,627 A * | 3/1987 | Hampson | ............... | B30B 9/3007 100/902 |
| 5,161,661 A * | 11/1992 | Hammond | ............ | G07F 7/0609 194/209 |
| 5,361,913 A * | 11/1994 | Melchionna | .......... | B07C 5/3412 194/208 |
| 6,675,947 B2 * | 1/2004 | Kiva | ...................... | B07C 5/3412 100/292 |
| 6,684,763 B2 * | 2/2004 | Park | ........................ | B30B 9/321 100/215 |
| 7,536,948 B1 * | 5/2009 | Cockrum | ................. | B30B 1/261 100/215 |
| 2003/0057144 A1 * | 3/2003 | Wang | .................... | B30B 9/3007 209/636 |
| 2003/0079620 A1 * | 5/2003 | Park | ........................ | B30B 9/321 100/48 |

* cited by examiner

*Primary Examiner* — Jimmy T Nguyen
(74) *Attorney, Agent, or Firm* — Hoglund & Pamias, PSC; Roberto J. Rios (57) ABSTRACT

This invention provides an apparatus for identifying and sorting part of recycling plastic bottles and aluminum cans. The invention eases the process of sorting recyclable material at the recycle bin to avoid the sorting later in the process. After sorting the material, the recycle bin compresses the bottles or the cans to accommodate more material into the corresponding material compartment. The invention is a modular arrangement allowing ease of replacing any of the three units of the apparatus: compression, classification, and storage.

11 Claims, 8 Drawing Sheets

MODULAR GARBAGE COLLECTION APPARATUS

BACKGROUND OF THE INVENTION

Waste and garbage management is one of the most critical problems of our time. Several attempts have been made in the past to overcome the problems associated with waste management and efficient trash recycling. For example, U.S. Pat. No. 7,143,905 provides an enclosure for a refuse container and a recyclable container includes a frame; a front and a rear carried by the frame and including an advertising holder, a refuse opening, and a recyclable opening, the refuse opening receiving refuse therethrough for depositing the refuse in the enclosed refuse container, the recyclable opening receiving recyclables therethrough for depositing the recyclables in the enclosed recyclable container; a rear carried by the frame and including an advertising holder for holding advertising; a left side carried by the frame and including an advertising holder for holding advertising; a right side carried by the frame and including an advertising holder for holding advertising thereon; and a roof carried by the frame. U.S. Pat. No. 5,447,017 provides an automatic recycling machine and automatic waste disposal system for plural types of household and commercial waste materials which automatically sorts, processes, shreds, crushes, compacts, rinses by cleaning liquid for removal of contamination and dirt from certain washable waste types, packages the waste material, and identifying the package with waste type and waste source by barcode marking. U.S. Pat. No. 4,821,969 provides in a can crusher, cans lying in a semicylindrical compaction chamber are crushed between a movable ram and a stationary anvil plate. The ram is driven by a ram rod extending from the ram, a ram rod crank arm pivoted to the ram rod and rotated by a power driven crankshaft. Crushed cans are ejected from between the ram and anvil plate after being crushed, and uncrushed cans are fed to a lengthwise position in the compaction chamber each time the ram moves back from the anvil plate. The uncrushed cans are fed, end-to-end, into the compaction chamber from a feed tube located above the chamber. The feed tube has a skewer-receiving opening provided in it, and a skewer-retaining sleeve extends out from the feed tube in surrounding relationship to the opening. The skewer crank arm is fixedly mounted on the crankshaft in fixed angular relationship with respect to the ram rod crank arm. When the ram is in its closest position to the anvil plate, the skewer is clear of the interior surface of the feed tube to allow uncrushed cans to move into contact with a can restricting camming surface of the ram rod, but just before the bottom can slides over the can restricting camming surface of the ram rod, the next-to-the bottom uncrushed can has been impaled by this skewer. U.S. Pat. No. 6,141,945 provides a multi-unit, automatic machine for compaction, packaging, and disposal of plural types of material such as newspaper, plastic containers, glass bottles, aluminum cans, or other household and commercial waste. Each type of material is automatically processed in a separate unit and than separately packaged and sealed in a special bar coded bag, which is then disposed of the machine.

However, there is long felt need for a low-cost integral recycling solution that allows modular replacement of its components while gathering associated data to share and analyze with other users or recycling apparatus.

SUMMARY OF THE INVENTION

This invention provides a means for identifying and sorting part of recycling plastic bottles and aluminum cans. The invention eases the process of sorting recyclable material at the recycle bin to avoid the sorting later in the process. After sorting the material, the recycle bin compresses the bottles or the cans to accommodate more material into the corresponding material compartment. The invention is a modular arrangement allowing ease of replacing any of the three units of the apparatus: compression, classification, and storage.

BRIEF DESCRIPTION OF THE DRAWINGS

Further features and advantages of the invention will become apparent from the following detailed description taken in conjunction with the accompanying figures showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Figure 1:
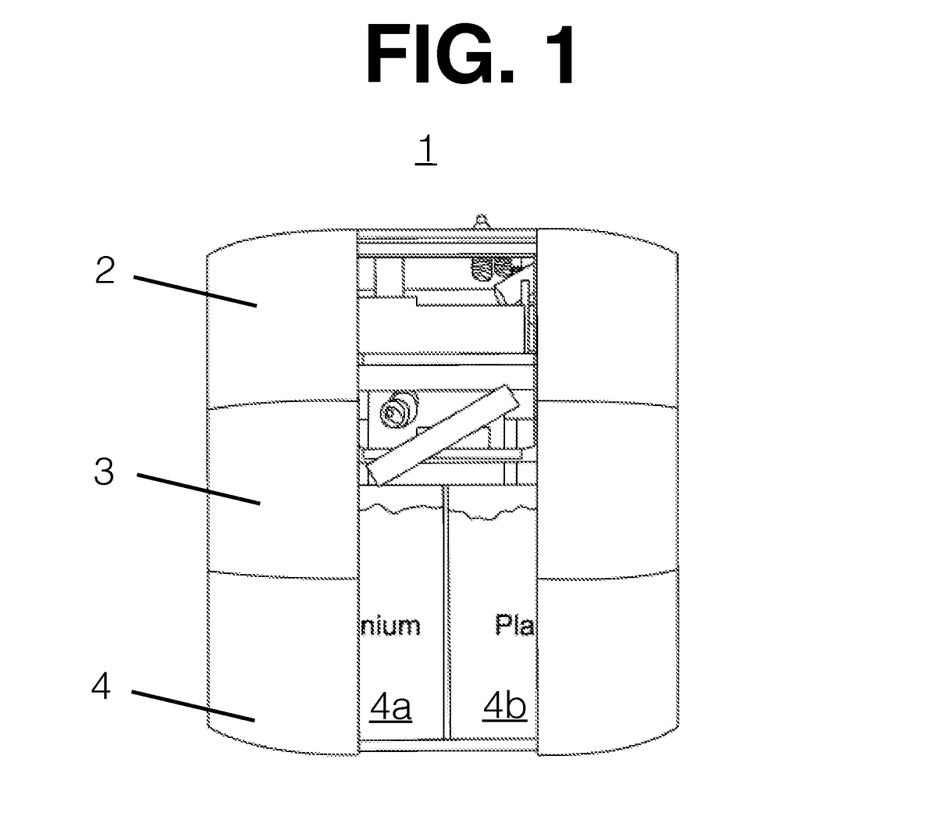
FIG. 1 shows a front view of a modular recycling trash bin according to the present invention.
Figure 2:
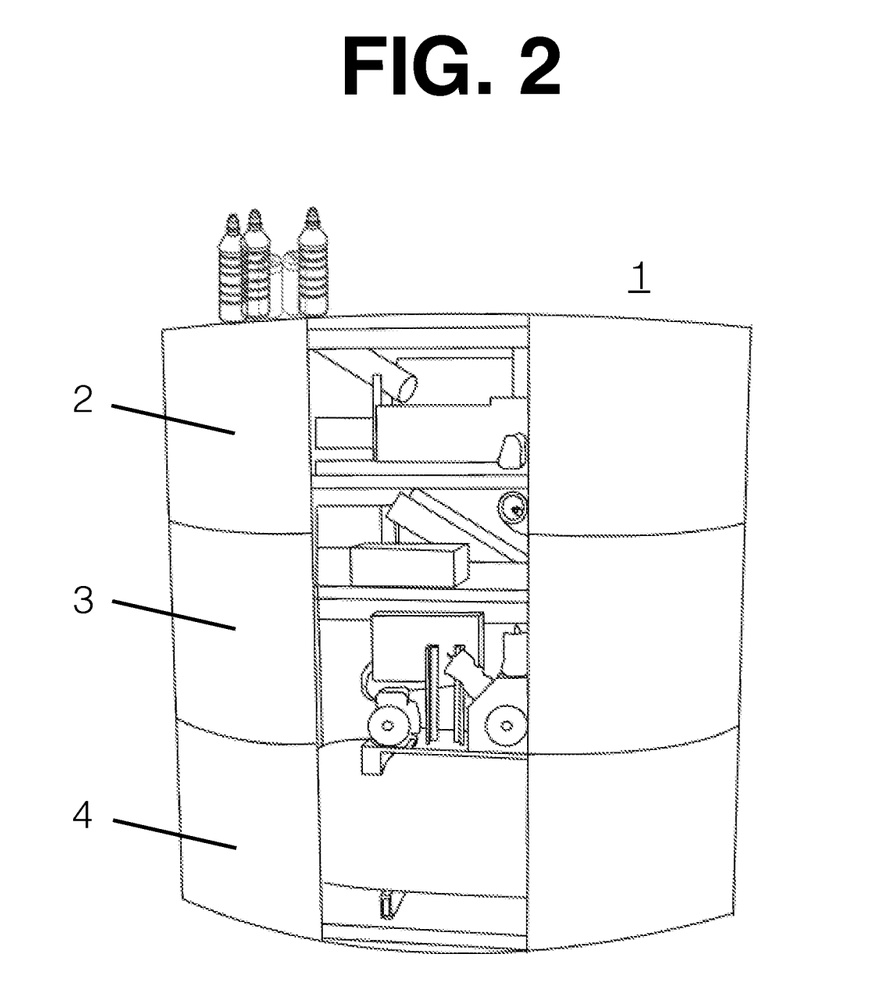
FIG. 2 shows a back view of a modular recycling trash bin according to the present invention.

The garbage collecting apparatus of the present invention is a modular arrangement having three separate units that are removable attached to each other. As shown in FIGS. 1 and 2, the garbage-collecting apparatus 1 has a compression unit 2 structurally coupled to a sorting unit 3, which is also structurally coupled to a collection unit 4. As can be appreciated, the units are vertically stacked, wherein the collection unit 4 is positioned at the bottom of the arrangement and the sorting unit 3 is positioned on top of said collection unit 4 and between said collection unit 4 and said compression unit 2, which is positioned at the top of the modular arrangement.

Figure 3:
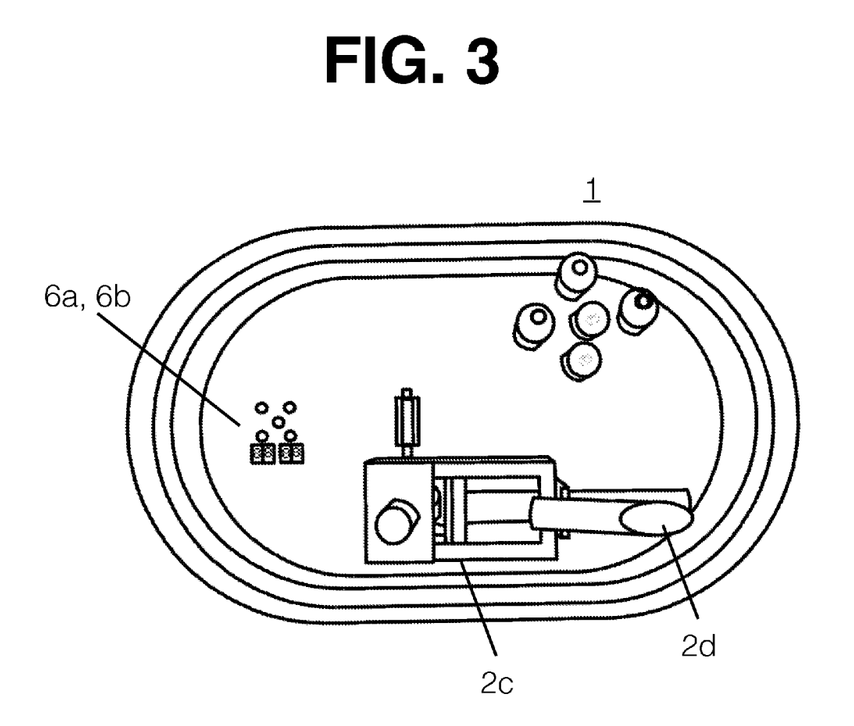
FIG. 3 shows a top view of a modular recycling trash bin according to the present invention.

FIG. 3 shows a top view of said compression unit 2. A container receiving unit 2c is located on said compression unit 2, wherein a receiving inlet 2d is provided outside said compression unit 2 for receiving either a plastic bottle or a metal can and is accessible providing an intuitive arrangement to any person. In addition, a visual and/or audio arrangement (6a, 6b) is provided outside said compression unit 2 for conveying specific information to a user related to the operation of the apparatus.

Figure 4:
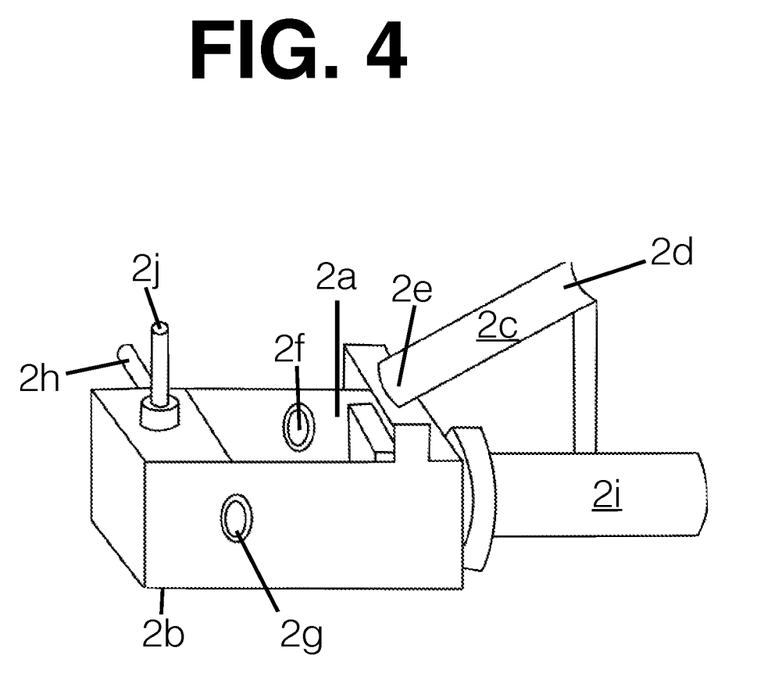
FIG. 4 shows a compression unit according to the present invention.

FIG. 4 illustrates an exemplary compression unit 2 according to the present invention. A container receiving unit 2c has an receiving inlet 2d for receiving either a plastic bottle or a metal can and a receiving outlet 2e for directing said plastic bottle or a metal can to the interior space of a compression compartment as shown in FIG. 4. In a preferred embodiment, the container receiving unit 2c is inclined to allow said plastic bottle or a metal can to slide by means of gravity. Alternatively, a moving mechanism such as but not limited to: a conveyor belt could be used to move and direct said plastic bottle or a metal can to the interior space of a compression compartment. The receiving outlet 2e is structurally positioned so that a plastic bottle or a metal can is easily directed to an input 2a of said compression compartment. A presence detector 2f is provided to sense the presence of a plastic bottle or a metal can inside said compression compartment. In a preferred embodiment, the presence detector 2f comprises a photoelectric sensor array. A material detector 2g is also provided to determine whether a plastic bottle or a metal can is inside the compression compartment. In a preferred embodiment said material detector 2g comprises an inductive sensor responsive only to metal cans. Once either a plastic bottle or a metal can is identified and positioned inside said compression compartment a perforation element 2h are perforated to allow for easier compressing. Puncture is done with a sharp object or any other media suitable to perforate plastic and aluminum. It is important to point out that the dimensions of the compressing compartment are such as to accommodate a plastic bottle or metal can at one time. Once the plastic bottle or metal can is punctured a compression element 2i is provided to compress the punctured bottle or can effectively preparing it for sorting and storage. A push element 2j is provided to direct said compressed bottle or can to an output portion 2b of said and compression compartment and into a sorting unit 3. In a preferred embodiment, the compression element 2i and the push element 2j is a piston or a linear actuator used to compress the aluminum cans or plastic bottles and to direct them into said sorting unit 3, respectively.

Figure 5:
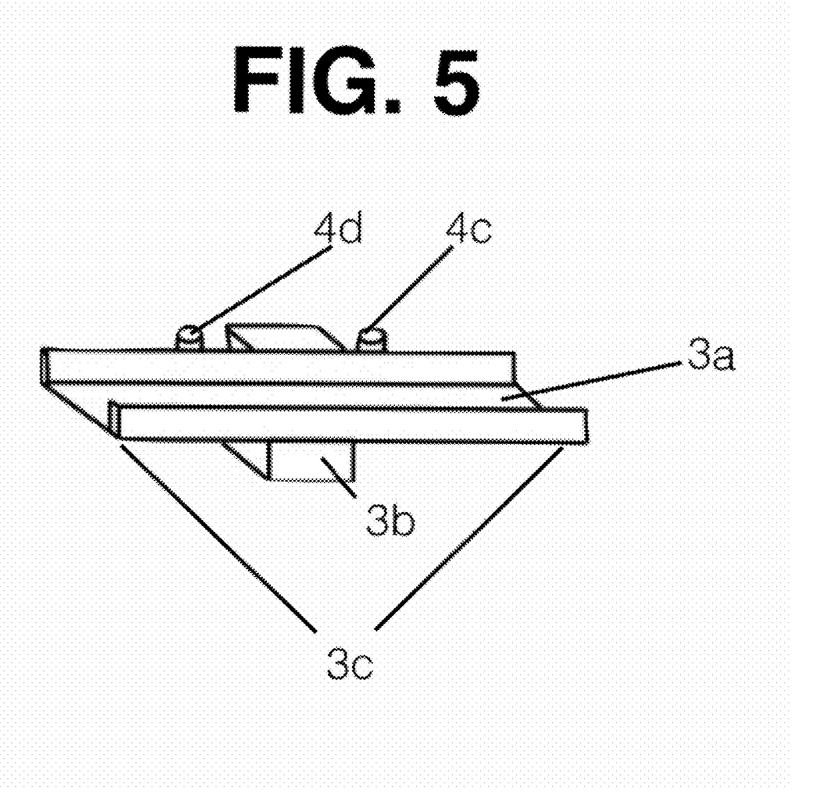
FIG. 5 shows a sorting unit according to the present invention.

FIG. 5 illustrates an exemplary sorting unit 3 according to the present invention. A classifying element 3a comprising a flat surface is provided to receive the compressed bottle or can from said output portion 2b of the compression compartment, wherein a sorting element 3b is structurally coupled to said classifying element 3a for selectively rotating said classifying element 3a between a left side position and a right side position. This arrangement allows the compressed bottle or can to be selectively directed between a first collection bin 4a and a second collection bin 4b as shown in FIG. 1.

Figure 5A:
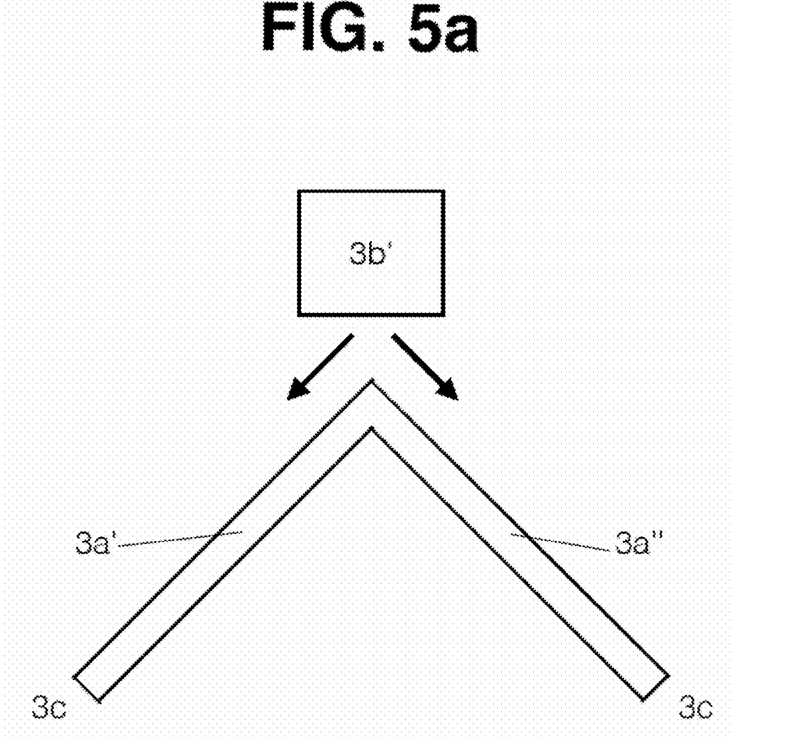
FIG. 5a shows a sorting unit according to another embodiment of the present invention.

Alternatively, other sorting mechanisms are envisioned including, as shown in FIG. 5a, two different slices 3a', 3a" (i.e.: inclined flat surfaces) and an actuator 3b' selectively directing the compressed bottle or can towards one of said slices. In addition, a first full bin detector 4c and a second full bin detector 4d is provided on each side; respectively to detect when collection bins 4a and 4b are full.

Figure 6:
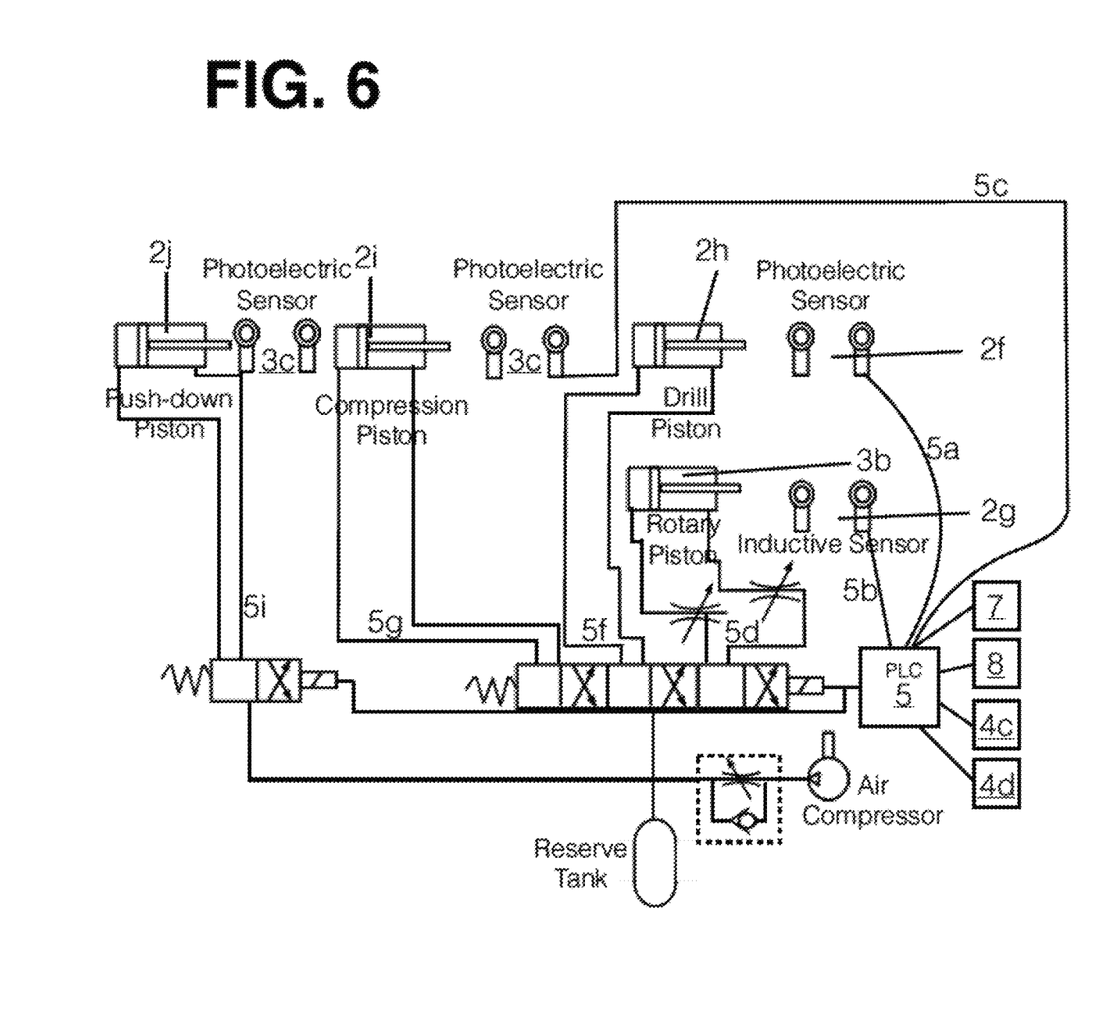
FIG. 6 shows a schematic of the connections for a control unit according to the present invention.

FIG. 6 illustrates a schematic of an exemplary control unit 5 and the connections with the rest of components of the apparatus. In a preferred embodiment the control unit 5 comprises a Programmable Logic Controller (PLC) having a plurality of inputs and outputs to selectively operate the apparatus. However, it is envisioned that other controlling elements such as but not limited to: an IC-based microcontroller or a computer-based microcontroller. As can be seen, the preferred embodiment of the invention is implemented with a PLC and a pneumatic system for actuating the various elements of the system such as linear or rotary pistons.

As previously explained, a visual and/or audio arrangement (6a, 6b) is provided to interact with a user or other apparatus. A visual displaying element could be used to convey special messages to users such as but not limited to: "Ready", "Busy", "Plastic compartment full" or "Aluminum compartment full". An audio element could be provided to motivate users to use the apparatus by sounding positive messages through a speaker such as but not limited to: "Thanks you" and "Have a nice day". Also, the audio element could be provided to inform users important information relating to the operation of the apparatus. This feature is important since users could simply insert the bottle of can and leave without verifying the visual elements for such information. A counting feature in the software of a microcontroller quantifies the number of bottles or cans that have been processed.

The apparatus of the present invention is designed to be able to build a wireless network of neighboring apparatus. This network could be available via the Internet by port interface, so that clients can monitor each trashcan's activity. This monitored baseline data can be accessed by recycling companies to make a number of different studies like marketing, statistics or viability studies and to optimize their collecting of recyclable material logistics. The modular construction of the system allows for replacement of each individual unit in a "plug and play" manner if damaged. Also, an emergency stop is provided by an emergency stop mechanism 8 if a safety sensor 7 is triggered, for example when a user inserts his/her hand inside the garbage can.

Figure 7:
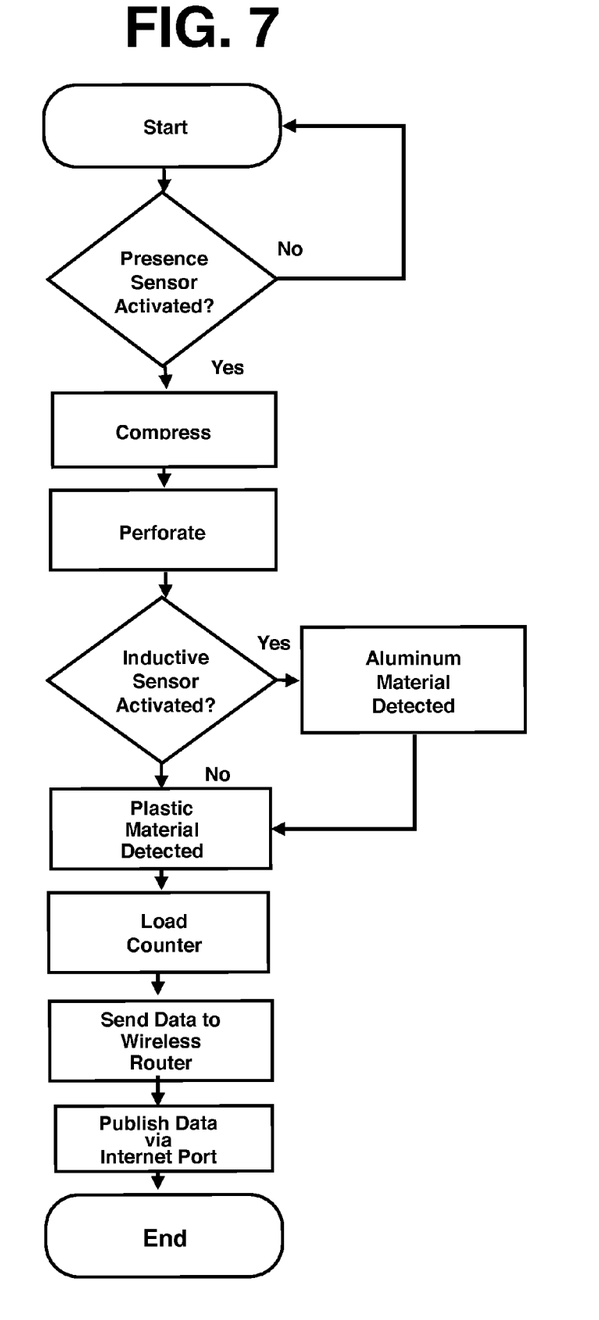
FIG. 7 shows the typical operation of the control unit of the apparatus according to the present invention.

The typical operation of the control unit of the apparatus will be explained in conjunction with the flowchart of FIG. 7. First, the control unit waits for activation of the presence detector 2f via a presence control input 5a. When a bottle or can is deposited into the apparatus the presence detector 2f is activated and: a) a perforation control output 5f activates the perforating element 2h and b) a compression control output 5g activates the compression element 2i. The control unit then verifies if the material detector is activated via a material control input 5b to determine whether a plastic bottle or a metal can is being processed. Once the material type is properly determined, the control unit activates the push element 2j via a push control output 5i to direct the bottle or can into the sorting unit 3, which in turn is activated by a rotary control output 5d to direct the bottle or can to either the first or the second output. A counting control input 5c is provided to receive a signal from first and second photoelectric sensors 3c indicative of whether the bottle or can is directed either to the first or the second output, which in turn is coupled to the plastic container or the metal container, respectively. All the information related to the operation of the apparatus could be provided as data that can be transmitted through the Internet via a network port for remote receipt and analysis. In addition, a plurality of garbage apparatus could be interconnected to provide a redundant network or to allow data exchange among the plurality of garbage apparatus.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

We claim:
1. A garbage collecting apparatus comprising:
a compression unit having:
a compression compartment having an input portion and an output portion;
a container receiving unit having a receiving inlet receiving at least one of: a plastic container and a metal container and a receiver outlet directing said at least one of: a plastic container and a metal container to the input portion of said compression compartment allowing said at least one of: a plastic container and a metal container to enter said compression compartment;

a presence detector sensing the presence of said at least one of: a plastic container and a metal container inside said compression compartment;
a material detector determining if a container inside said compression compartment is made of metal or plastic;
a perforation element perforating said at least one of: a plastic container and a metal container inside said compression compartment;
a compression element compressing said at least one of: a plastic container and a metal container inside said compression compartment;
an push element directing said compressed container to the output portion of said compression compartment;
a sorting unit having:
a classifying element receiving said compressed container from said output portion of said compression compartment;
a sorting element configured to direct said compressed container to either a first output or a second output via said classifying element; and a counting arrangement configured to count the amount of compressed containers directed to said first and second output;
a collection unit having:
a first collection bin receiving a compressed container from said first output;
a first full bin detector detecting when said first collection bin is full;
a second collection bin receiving a compressed container from said second output;
a second full bin detector detecting when said second collection bin is full; and
a control unit having:
a presence control input receiving a signal from said presence detector;
a material control input receiving a signal from said material detector;
a counting control input receiving a signal from said counting arrangement when said compressed container is directed to said first and second output;
a first full bin control input receiving a signal from said first full bin detector;
a second full bin control input receiving a signal from said second full bin detector;
a perforation control output configured to actuate said perforation element;
a compression control output configured to actuate said compression element;
a push control output configured to actuate said push element; and
a sorting control output configured to actuate said sorting element.

2. The garbage collecting apparatus of claim 1, wherein said presence detector comprises a photoelectric sensor.

3. The garbage collecting apparatus of claim 1, wherein said material detector comprises an inductive sensor.

4. The garbage collecting apparatus of claim 1, wherein said classifying element comprises a flat element structurally coupled to said sorting element, said sorting element comprises a rotary actuator that rotates said classifying element between said first output and said second output.

5. The garbage collecting apparatus of claim 1, wherein said classifying element comprises a first flat element configured to direct said compressed container to said first output and a second flat element configured to direct said compressed container to said second output, said sorting element being configured to direct the compressed container received from the output portion of said compression compartment to either the first flat element or the second flat element.

6. The garbage collecting apparatus of claim 1, wherein said counting arrangement comprises a first photoelectric sensor in the proximity of said first output and a second photoelectric sensor in the proximity of said second output.

7. The garbage collecting apparatus of claim 1, wherein said control unit further comprises an indication control output connected to an indicating element.

8. The garbage collecting apparatus of claim 7, wherein said indicating element comprises at least one of: a visual element and an audible element.

9. The garbage collecting apparatus of claim 1, further comprising an emergency stop mechanism configured to automatically stop operation of the garbage collecting apparatus if a safety sensor is triggered.

10. The garbage collecting apparatus of claim 1, wherein said control unit further comprises a network interface configured to transmit data associated to the operation of said garbage collecting apparatus to a remote device.

11. The garbage collecting apparatus of claim 10, wherein said remote device comprises at least one of:
another garbage collecting apparatus and a remote server.

* * * * *